United States Patent [19]
Crawford et al.

[11] Patent Number: 6,064,791
[45] Date of Patent: May 16, 2000

[54] RESTORATION OF LOOSE TUBE FIBER OPTIC CABLE

[75] Inventors: Greg Richard Crawford, Cortland; Bruce William DeForrest, Groton; Cornelius C Van Deusen, Ithaca, all of N.Y.

[73] Assignee: New York Telephone, New York, N.Y.

[21] Appl. No.: 09/065,546

[22] Filed: Apr. 24, 1998

[51] Int. Cl.[7] ................................................. G02B 6/38
[52] U.S. Cl. ............................................................ 385/134
[58] Field of Search ............................. 385/59, 134, 135

[56] References Cited

U.S. PATENT DOCUMENTS

| | | | |
|---|---|---|---|
| 4,502,754 | 3/1985 | Kawa ...................................... | 350/96.2 |
| 4,898,448 | 2/1990 | Cooper ................................... | 350/96.2 |
| 5,659,650 | 8/1997 | Arnett ..................................... | 385/135 |
| 5,734,776 | 3/1998 | Puetz ...................................... | 385/134 |
| 5,778,130 | 7/1998 | Walters et al. .......................... | 385/134 |
| 5,790,739 | 8/1998 | Strause ................................... | 385/135 |
| 5,825,964 | 10/1998 | Goetter et al. ......................... | 385/135 |

*Primary Examiner*—Hung N. Ngo
*Attorney, Agent, or Firm*—Ohlandt, Greeley, Ruggerio & Perle, L.L.P.

[57] ABSTRACT

A fiber optic cable restoration apparatus preferably includes two weather-tight enclosures, connector panel with a plurality of connector interfaces for optically coupling two optical fibers received therein. Each connector interface includes a bare fiber adapters for receiving a bare optical fiber therein. The connector interfaces of each connector panel are connected across a connectorized MIC cable to form a communication bridge therebetween. Two cut ends of a cable can be repaired by inserting the individual fibers of one cut cable end into respective bare fiber connectors of one enclosure and inserting the individual fibers of the other cut cable end into the respective bare fiber adapters of the other enclosure. The apparatus is easier and faster to use and more cost efficient than present methods of repairing cables and eliminates the need for circuit rerouting operations altogether.

18 Claims, 3 Drawing Sheets

RESTORATION OF LOOSE TUBE FIBER OPTIC CABLE

FIELD OF THE INVENTION

The present invention relates to optical cable repair and, more particularly, to an apparatus for repairing a cut fiber optic cable.

BACKGROUND OF THE INVENTION

Fiber optic cables are currently utilized as communication transmission lines in many networks by communication providers such as telephone companies, cable television, and their likes. Cables are sometimes damaged due to ordinary wear and tear, natural disasters (i.e., storms, hurricanes, . . . etc.), wild animals and so forth. The resulting loss of communication services during a fiber optic outage results in a loss of the message rate and toll revenues, rebates, lost customers, regulatory costs, bad publicity, lost business and isolation for customers, . . . etc.

Current methods for repairing damaged or cut optical fibers employ splicing, i.e., reconnecting the cut optical fibers across a repair cable. There are currently two splicing methods, mechanical splicing and fusion splicing. Mechanical splicing requires that each cut cable end be secured into a corresponding closure, stripped and cleaved to expose the individual optical fibers. Approximately 6 feet of each cable end is exposed. Each optical fiber from the cut end is cleaned and then inserted into a mechanical splicing device. The ends of the repair cable (to be connected between the cut cable ends) are also prepared and, the optical fibers of the repair cable are likewise inserted into the mechanical device, typically maintained on a splicing trailer. The mechanical splicing device is then employed to connect each optical fiber (i.e., by crimping). Mechanical splicing requires expert training to perform and a substantial amount of the damaged cable to be dug up (if buried) or loosened (if aerial).

Fusion splicing involves the use of a fusion splicer to fuse the cut ends together, using a repair cable. Fusion splicing is sensitive to temperature, i.e., hot, cold and so forth, and must be performed in a temperature regulated environment such as a splicing trailer. To accomplish the foregoing, there must be enough cable slack such that a portion of the cable can be pulled into the fusion trailer. Typically, approximately 70 feet of the damaged cable is dug up or loosened, 6 feet of which is exposed (i.e., stripped and cleaved) when placed into the fusion trailer.

In fusion splicing, the cut cable ends and the repair cable ends are also prepared (stripped, cleaved and cleaned) to expose the single optical fibers which are then placed onto a tray. Fusion splicers are then employed to fuse the optical fibers of the cut end to those of the repair end. Fusion splicing requires expert training and a substantial portion of the damaged cable to be dug up or loosened. An expert in fusion splicing will typically take approximately 30 to 45 minutes to fusion splice twelve optical fibers (not including the preparation time, before the actual splicing operation is performed).

In a typical repair scenario of a cut optical cable, various types of equipment and personnel must be sent to the cable site. Such equipment includes at least one splicing trailer, fusion and/or mechanical splicing equipment, a spare reel of optical cable and two splice closures. In the event that the cable is buried underground, a back-hoe and operator must also be dispatched to dig out the cable. If the cable is aerial, line trucks must also be dispatched to loosen the cable from the strand next to the closest slack loop. In any event, a substantial portion of the damaged cable must be dug up or loosened. It is also important to patch up the cable so that the damaged cable may be permanently fixed at a later time.

It is sometimes difficult to obtain the above equipment, i.e., the splicing trailer, line trucks, back-hoe as well as to obtain an expert in fusion splicing and/or mechanical splicing. In many cases, the equipment must be borrowed from another production or project. For instance, the splicing trailers may already be busy at another location, or on loan to another area. Accordingly, the process of finding the appropriate equipment and personnel and sending them/it to the site increases the time and cost of repairing the cable.

Another problem arises when the damaged fiber optic cables are not accessible to the trailers, i.e., not enough slack on the cut cable. This may occur when the damaged portion of the cable is located in an inaccessible area such as a swamp, wooded area, and so forth that have little or no road access.

During cable repair, traffic must be rerouted. The central office must reroute circuits by patching at cross-connect frames. However, there are rarely enough alternate facilities to patch to. The rerouting operations also take a considerable time to set up and perform. Accordingly, only a portion of the communication traffic along the damaged cable can be rerouted.

In general, a good cable restoration, using the above splicing methods, takes at least six hours and involves many parallel activities aimed at patching or repairing the cable and rerouting traffic. The splicing techniques cannot be quickly and easily taught, but instead requires extensive training and continual practice. As the cable is being repaired, only some of the traffic can be rerouted at the central office due to a lack of alternate facilities. Therefore, there is a need for a faster, simpler and more cost efficient method and apparatus for repairing a cut fiber optic cable and restoring service to the customers.

Accordingly, it is an object of the invention to provide a cable restoration apparatus that enables a cut or damaged fiber optic cable to be quickly and easily repaired.

It is a further object of the invention to provide a restoration apparatus that does not require expert training to utilize.

Another object of the invention is to provide a cable restoration apparatus for use in emergency situations.

It is also an object of the invention to provide a low cost cable restoration apparatus constructed from ordinarily available commercial items.

It is a further object of the invention to provide a restoration apparatus that can quickly and efficiently restore communication services to minimize the negative impacts resulting from the loss of communication services.

SUMMARY OF THE INVENTION

A fiber optic cable restoration apparatus preferably includes two weather-tight enclosures, each having a connector panel with a plurality of connector interfaces for optically coupling two optical fibers received therein. Each connector interface includes a bare fiber adapters for receiving a bare optical fiber therein. The connector interfaces of each connector panel are connected across a connectorized MIC cable to form a communication bridge therebetween. Two cut ends of a cable can be repaired by inserting the individual fibers of one cut cable end into respective bare fiber connectors of one enclosure and inserting the individual fibers of the other cut cable end into the respective bare fiber adapters of the other enclosure, thereby forming a communication pathway therebetween. The apparatus is easier and faster to use and more cost efficient than present methods of repairing cables and eliminates the need for circuit rerouting operations altogether.

DETAILED DESCRIPTION OF THE INVENTION

Figure 1:
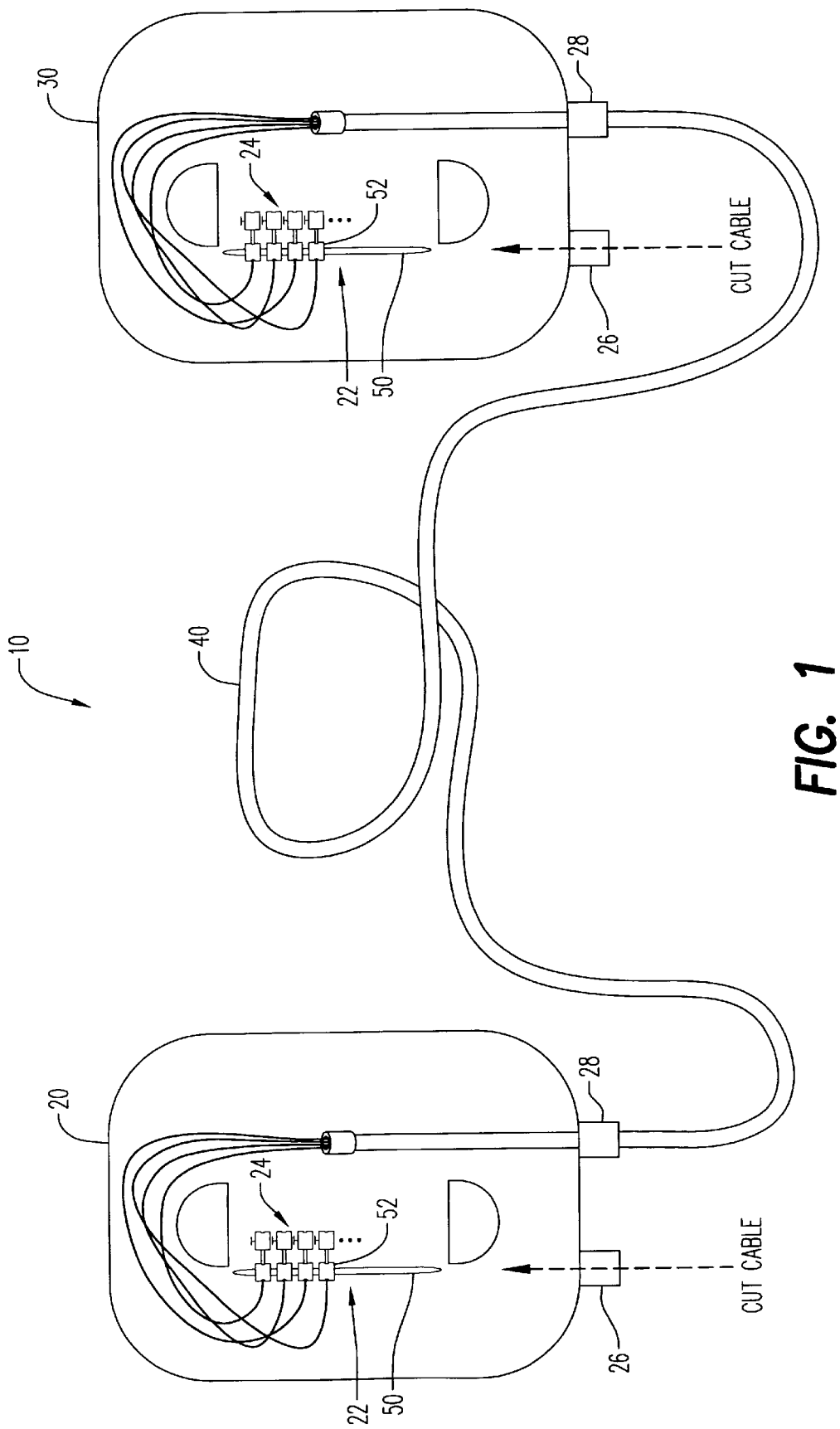
FIG. 1 illustrates a diagram of a cable restoration apparatus in accordance with the present invention.

Referring to FIG. 1, a cable restoration apparatus 10 in accordance with the present invention includes first and second sealable enclosures 20, 30, each having a first cable entry port 26 and a second cable entry port 28. Each entry port 26, 28 preferably includes a bushing for holding a portion of a cable inserted therethrough. Each enclosure 20, 30 further includes a connector panel 22, having a plurality of connector interfaces 52 for optically coupling two optical fiber ends received therein. Each connector interface 52 includes a bare fiber adapter 24. A connectorized modular fiber cable 40 is optically coupled between connector panels 22 of first enclosure 20 and second enclosure 30, via respective second entry ports 28, to form a communication pathway between each respective bare fiber adapter 24 (via corresponding connector interfaces 52) of enclosures 20, 30. It is preferred that a portion of each enclosure 20, 30 can be opened or detached, by conventional means, such as a hinge to provide access into the enclosures and connector panels 22 therein.

Figure 2:
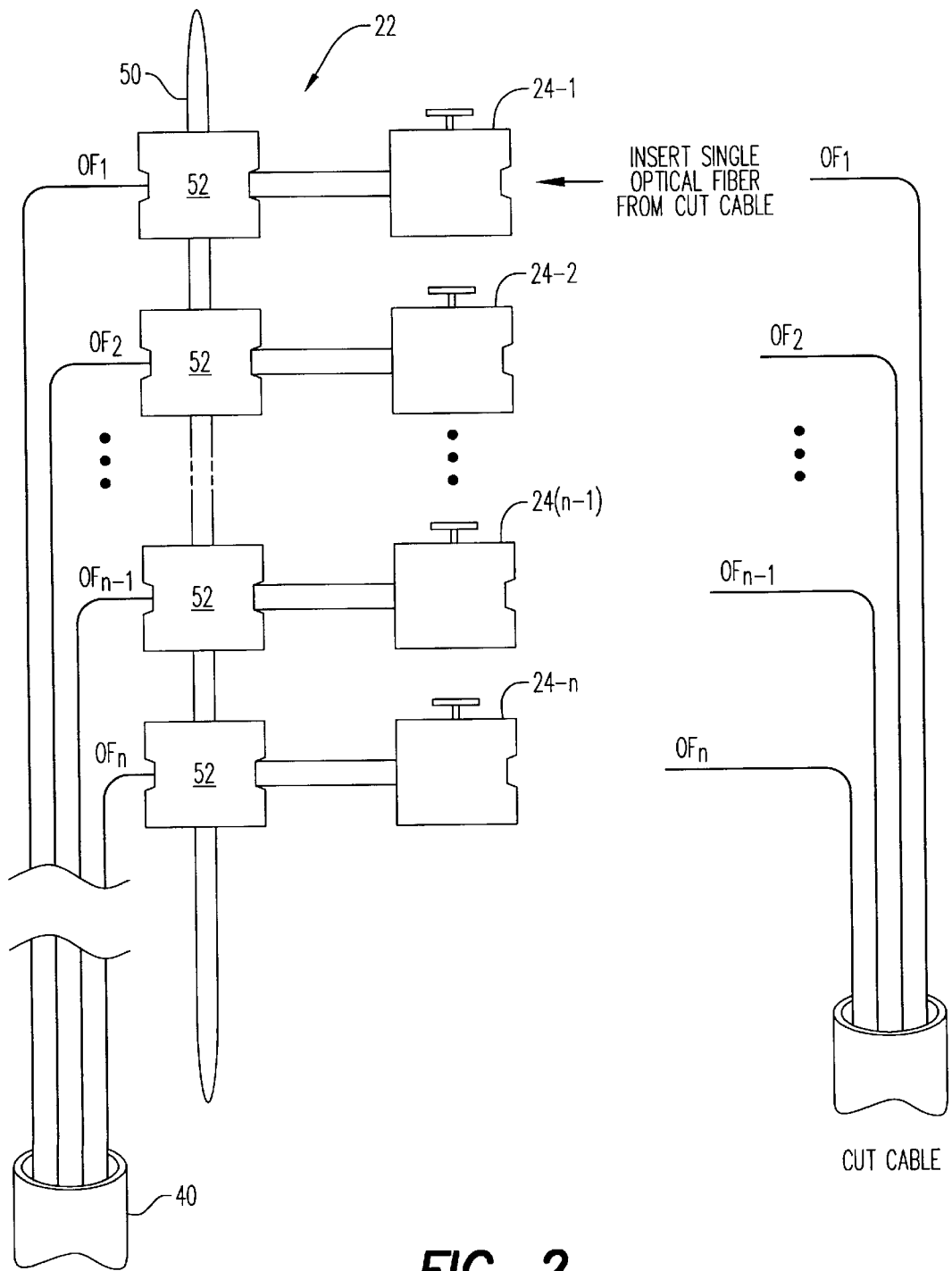
FIG. 2 illustrates an overview of a connector panel in accordance with the present invention.

As can be seen in FIGS. 1 and 2, each optical fiber $OF_1$ through $OF_N$ (where N is the number of optic fibers) of fiber cable 40 is coupled to a corresponding bare fiber adapter 24-1 through 24-N on connector panel 22, across a connector interface portion 52. Each bare fiber adapter 24 is associated with a particular optic fiber to ensure that the single optical fibers of the damaged cable are properly reconnected across cable restoration apparatus 10.

This is made easier by the fact that, in practice, each optical fiber in a fiber optic cable can be easily identified, for example, by the color of the plastic protective coating thereon such as red, orange, blue, green, white and gray. As such, each bare fiber adapter 24 on connector panel 22 can be associated with a particular optic fiber by color. For instance, bare fiber adapter 24-1 (FIG. 2) can be used to couple to a fiber optic $OF_1$ having a red protective coating, and so forth.

To repair a damaged optical cable, a first cut end of the damaged optical cable is inserted through first cable entry port 26 of first enclosure 20, and the single optical fibers of the first cut end $OF_1$ through $OF_N$ are respectively inserted into bare fiber adapters 24-1 through 24-N on connector panel 22. Likewise, a second cut end of the damaged optical cable is inserted through first cable entry port 26 of second enclosure 30, and the single optical fibers of the second cut end $OF_1$ through $OF_N$ are respectively inserted into bare fiber adapters 24-1 through 24-N. As a result, the first and second cut ends can be joined using a single cable restoration apparatus 10. The repair operation as described above can either be done one cut cable end at a time or simultaneously.

Figure 3:
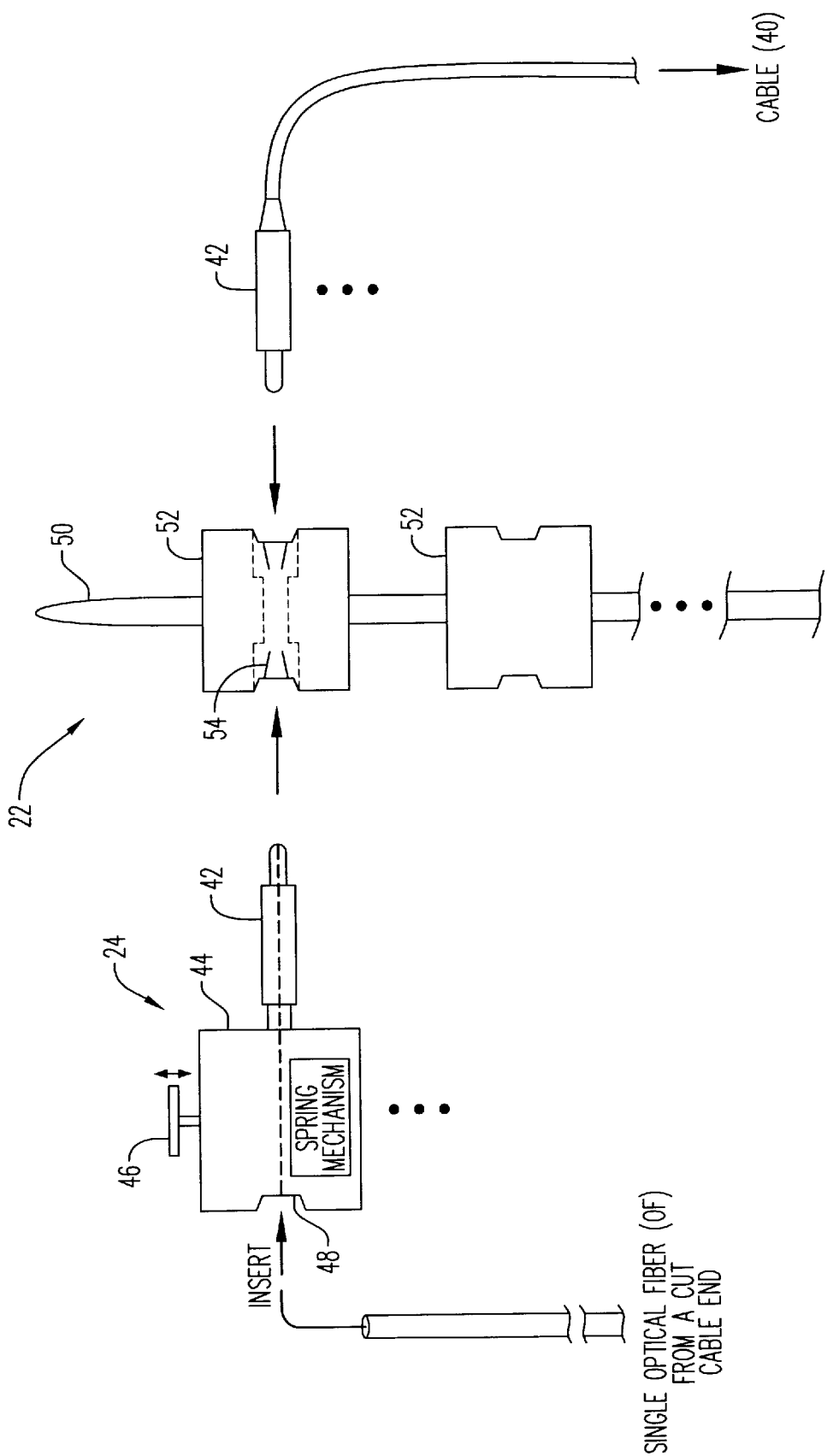
FIG. 3 illustrates an exploded view of a connector panel and components therein in accordance with the present invention.

FIG. 3 illustrates an exploded view of connector panel 22 and its components. Connector panel 22 includes a mounting structure 50 (i.e., a board) having a plurality of connector interfaces 52 therein corresponding at least to the number of bare fiber adapters 24. Mounting structure 50 can be permanently or detachably mounted in the internal cavity of enclosures 20, 30.

Each connector interface 52 has a first opening to receive a bare fiber adapter 24 and a second opening, positioned on the opposite end, to receive an optical head 42 coupled to a single optic fiber from fiber cable 40. Connector interface 52 further includes extended flexible, fingers 54 that detachably hold bare fiber adapter 24 and optical head 42 of cable 40 in place when inserted therein. As shown in FIG. 3, bare fiber adapter 24 and optical head 42 of fiber cable 40 can be respectively inserted into the internal cavity of connector interface 52 (defined by the dotted lines) such that an optical pathway is formed therebetween. It is preferred that each bare adapter 24 and each corresponding optical fiber of fiber cable 40 (via optical head 42) is pre-assembled onto connector interface 52.

Bare fiber adapter 24 includes an optical head 42, fiber clamping portion 44 for holding an optical fiber therein and a hollow cavity therein for receiving the optical fiber (denoted by the dotted line). Clamping portion 44 includes an opening 48 for inserting the optic fiber therein and a spring-biased mechanism that clamps the optical fiber against an interior surface when a plate 46 is in its normal position, i.e., an up position. When plate 46 is pressed down (i.e., into the down position), an optic fiber can either be inserted or removed from bare fiber adapter 24. It is preferred that cable restoration apparatus 10 employs EXFO BFA-54 bare fiber adapters manufactured by EXFO Electro-Optical Engineering, a Canadian company or equivalent bare fiber adapters. Bare fiber adapters are well-known in the art and will not be discussed in further detail.

The operation of restoring a damaged fiber optic cable, having a first cut cable end and a second cut cable end, will now be described. Initially, approximately 2 or more feet of each cut cable end is either dug up (if buried) or loosened (if aerial). A first cut cable end is stripped and cleaved of its protective film, preferably along approximately three or four feet from the cable end. This will reveal a number of single optical fibers, i.e., $OF_1$ through $OF_N$, that are bundled therein. Thereafter, the protective plastic coating of each optical fiber is stripped off. It is preferred that approximately 1.0 to 1.5 inches of the plastic coating is stripped from the end of the optical fiber. Each optical fiber is then cleaved to create a perpendicular terminal surface. It is preferred that the cleaved end of the optical fiber be approximately 0.5 to 1.0 inches away from the plastic coating.

Once the first cut cable end has been prepared, it is inserted through a first cable entry port 26 into the interior of first enclosure 20. Note that the first cut cable end can also be inserted into enclosure 20 and then prepared in the manner described above. In either case, each optical fiber $OF_1$ through $OF_N$ of the cut cable is then inserted into respective bare fiber adapter 24-1 through 24-N of connector panel 22. Prior to insertion, each fiber is wiped clean, for example, with a lint free tissue.

The second cut cable end of the damaged cable is likewise prepared (as described above) by stripping the protective coating off the cable and then stripping and cleaving each optical fiber $OF_1$ through $OF_N$. The cable is inserted into second enclosure 30, via first cable entry port 26. Thereafter, each optical fiber $OF_1$ through $OF_2$ is inserted into respective bare fiber adapters 24-1 through 24-N. Note that the connection operations of the first and second cut cable ends can either be performed one at a time with one team of technicians or simultaneously with two teams.

It is important to understand that cable restoration apparatus 10 decreases the overall time for cable restoration by cutting down on the preparation time involved before the actual reconnecting operation is performed. That is to say, unlike splicing that requires a substantial amount of slack on the cut cable, the present invention only requires approximately 6 feet of each cut cable end. Therefore, the preparation time for cable restoration apparatus 10 can thus be decreased. Repairing a damaged optical cable using cable restoration apparatus 10 also requires minimal training and can be performed quickly and efficiently.

Test Results

Experiments have been conducted to compare cable restoration apparatus 10 to current known methods, namely fusion and mechanical splicing. The experiments focused primarily on three factors: (i) the ease of use, (ii) the operational expense and (iii) the speed of restoration. Each factor was scored on a scale of 1 to 100 with 100 being the best and 1 being the worst. The speed of the restoration was given the highest weight (i.e., 8×) out of the three factors. Table I is provided below to illustrate the effectiveness of cable restoration apparatus 10 of the present invention in relation to mechanical splicing and fusion splicing.

TABLE I

|  | Ease of Use | Operational Expense | Speed of Restoration | Figure of Merit | Importance % |
|---|---|---|---|---|---|
| Weight Factor | 1 | 1 | 8 |  |  |
| Mechanical Splicing | 20 | 45 | 20 | 225 | 19.9 |
| Fusion Splicing | 10 | 50 | 10 | 140 | 11.2 |
| Cable Restoration Apparatus | 90 | 90 | 90 | 990 | 70.9 |

As can be seen in Table I, cable restoration apparatus 10 is easier to use, less costly and faster to implement than present splicing methods for repairing optical cables. The effectiveness of the present invention significantly reduces and sometimes entirely eliminates the need for circuit rerouting operations at the central station.

In particular, cable restoration apparatus 10 is easy to use because it requires minimal training and equipment to perform. A technician need only strip and cleave the cut cable ends (using a wire cutter and stripper) and insert the single fibers of the cable ends into their respective bare fiber adapters. Cable restoration apparatus 10 can also be easily brought directly to the cable site, and the repair can be performed with minimal cable slack meaning that approximately 2 or more feet of the cable ends is dug up (if buried) or loosened (if aerial), approximately 2 feet of which is preferably exposed (i.e., stripped and cleaved). Additional efficiencies are also gained because cable restoration apparatus 10 allows test access at the location of the field repair.

In comparison, mechanical and fusion splicing require complex equipment, i.e., mechanical splicing device, fusion splicer, . . . etc. and expert training to perform. The splicing equipment is typically maintained in a splicing trailer and, thus, requires that the cables be pulled into the trailers. This ordinarily requires that approximately 70 feet of the cable be dug up or loosened, at least 6 feet of which is exposed when placed into the splicing trailer. Accordingly, the splicing methods require a substantial amount of cable slack and are difficult to utilize when the damaged cables are located in areas that have little or no road access.

The present invention is also more cost efficient than current splicing methods. Cable restoration apparatus 10 is constructed of components that are commercially available such as bare fiber adapters, MIC cable, water-proof enclosures, . . . etc. The restoration can simply be performed with wire cutters and strippers and requires little prior training or expertise. Comparatively, splicing requires complex and expensive equipment such as a mechanical splicing device or a fusion splicer which are maintained on a trailer. Such equipment must be operated by an expert splicer, thereby increasing the overall cable repair cost. There are also additional costs involved, mostly labor related, as more of the cut cables must be dug up or loosened in order to perform the necessary splicing operation.

Finally, a cut optical cable can be quickly repaired using the present invention. Cable restoration apparatus 10 allows an optical cable to be patched in approximately one to two hours. This is an approximately 60 percent reduction in time from current splicing techniques that require at least 6 hours to complete. A splicing restoration will require even more time if the cables are located in areas that have little or no road access. Accordingly, fiber optic continuity using the present invention can be restored so quickly that circuit patching and other operations can be significantly reduced and sometimes eliminated altogether. Moreover, such a quick restoration minimizes the negative impacts associated with the loss of communication services, such as the loss of the message rate and toll revenues, rebates, lost customers, regulatory costs, bad publicity, lost business, isolation for customers, . . . etc. Such a repair using cable restoration apparatus 10 also consistently adds insertion losses under 0.25 dB.

In summary, the present invention provides a fast and simple method and apparatus for repairing a cut fiber optic cable that requires minimal training to implement. The cable restoration apparatus of the present invention can be utilized to repair damaged optical cables located in areas that have little or no road access.

The invention having thus described with particular reference to the preferred forms thereof, it will be obvious that various changes and modifications may be made therein without departing from the spirit and scope of the invention as defined in the appended claims.

What is claimed is:

1. A cable restoration apparatus for repairing a cut optical cable having at least one optical fiber, said optical fiber of said cut optical cable having a first cut end and a second cut end, said cable restoration apparatus comprising:

a first connector panel, having at least one first optical interface for optically coupling two optical fiber ends received therein;

a second connector panel, having at least one second optical interface for optically coupling two optical fiber ends received therein; and optical cable means, having at least one optical fiber, said optical fiber of said optical cable means having one end connected to said first optical cable interface and the other end connected to said second optical cable interface, wherein said first cut end can be connected to said first optical interface and said second cut end can be connected to said second optical interface to form a communication pathway across said optical cable means.

2. The apparatus as recited in claim 1, wherein said first and second optical interfaces each include an adapter for receiving said first or second cut ends respectively.

3. The apparatus as recited in claim 2, wherein said adapter includes means for detachably holding one of said first or second cut end in optical communication with the other of said first or second cut end.

4. The apparatus as recited in claim 2, wherein said adapter is a bare fiber adapter.

5. The apparatus as recited in claim 1, wherein each of said first and second connector panels is maintained in an enclosure.

6. The apparatus as recited in claim 5, wherein said enclosure includes a movable panel for allowing access into said enclosure.

7. The apparatus as recited in claim 6, wherein said panel is hinge coupled to said enclosure.

8. The apparatus as recited in claim 5, wherein said enclosure includes a detachable panel for allowing access into said enclosure.

9. The apparatus as recited in claim 5, wherein said enclosure is waterproof.

10. The apparatus as recited in claim 5, wherein said enclosure includes at least two strain-relief entry ports for holding a portion of a cable therein.

11. The apparatus as recited in claim 10, wherein each of said entry ports includes a bushing for securely holding a portion of a cable in said entry ports.

12. The apparatus as recited in claim 1, wherein each of said first connector panel and said second connector panel includes a plurality of said optical interfaces.

13. The apparatus as recited in claim 1, wherein each of said optical interface includes a bore therethrough, said bore being adapted to receive said two optical fiber ends in optical communication to each other.

14. A cable restoration apparatus for forming a communication pathway between a first cable and a second cable, said first cable having a first optical fiber and said second cable having a bare second optical fiber, said cable restoration apparatus comprising:

a connector panel having an optical interface, said optical interface for receiving said first optical fiber and having a bare fiber adapter for receiving said bare second optical fiber, thereby forming a communication pathway between said first cable and said second cable; and an enclosure for housing said connector panel.

15. The apparatus as recited in claim 14, wherein said bare fiber adapter holds said bare second optical fiber.

16. The apparatus as recited in claim 15, wherein said bare fiber adapter includes means for detachably holding said bare second optical fiber.

17. The apparatus as recited in claim 14, wherein said enclosure includes a movable panel for allowing access into said enclosure.

18. The apparatus as recited in claim 14, wherein said enclosure is waterproof.

* * * * *